US012738255B2

(12) United States Patent
Polinski

(10) Patent No.: US 12,738,255 B2
(45) Date of Patent: Sep. 15, 2026

(54) THREE-WAY SELECTOR SWITCH

(71) Applicant: David Polinski, Stuart, FL (US)

(72) Inventor: David Polinski, Stuart, FL (US)

( * ) Notice: Subject to any disclaimer, the term of this patent is extended or adjusted under 35 U.S.C. 154(b) by 968 days.

(21) Appl. No.: 18/057,798

(22) Filed: Nov. 22, 2022

(65) Prior Publication Data

US 2024/0169965 A1 May 23, 2024

(51) Int. Cl.
*G10H 3/18* (2006.01)

(52) U.S. Cl.
CPC ............ *G10H 3/182* (2013.01); *G10H 3/181* (2013.01)

(58) Field of Classification Search
CPC ........ H01H 23/00; H01H 23/02; H01H 23/08; H01H 23/24; H01H 3/04; H01H 2209/046; H01H 2209/052; H01H 2221/016; H01H 2221/044; H01H 2227/028; H01R 13/70; H01R 13/7036; G10H 3/182; G10H 3/181; G10H 1/18; G10H 3/186; G10H 3/18
See application file for complete search history.

(56) References Cited

U.S. PATENT DOCUMENTS 6,319,030 B1 * 11/2001 Wu .................... H01R 13/7033
439/668
7,208,673 B2 * 4/2007 Bryce .................... G10H 3/182
84/742

* cited by examiner

*Primary Examiner* — Lheiren Mae A Caroc
(74) *Attorney, Agent, or Firm* — McHale & Slavin, P.A.

(57) ABSTRACT

A 3-way selector switch suitable for a two-pickup guitar. The switch provides a replaceable toggle lever wherein a selection of toggle levers can be used to provide color and tactile touch identification. The switch further provides an electrical contact with reciprocal shapes to provide premium coupling to eliminate signal loss.

11 Claims, 9 Drawing Sheets

THREE-WAY SELECTOR SWITCH

FIELD OF THE INVENTION

This invention relates to the field of electrical switches and, in particular, to an improved 3-way selector switch.

BACKGROUND OF THE INVENTION

Mechanical switches using a toggle lever to direct or isolate an electrical path are well known in the industries. A conventional mechanical switch consists of one or more pole and one or more throws (e.g. SPST, DPDT) and the like. The switches consist of small contact points rated for a maximum current. Identification of the throws is typically enhanced by placing a colored sleeve over the throw for ease of identification. An example of a use of a 3-way toggle switch is for a two-pickup guitar with humbuckers, single-coils, or a combination of both (master volume, master tone).

Problems with the conventional switches include lack of reliability for supplying a proper continuity for sensitive equipment, such as electric guitars. The small contact points are known to wear quickly, unevenly, or become misaligned, leading to sound distortions when used with sensitive equipment. Some guitars use a humbucking pickup, or double coil, to cancel out the noisy interference picked up by coil pickups. Switches that are unable to provide a contact without resistivity can result in further interference. Degradation of signal flow occurs with the bullet point contact, and voltage handling is limited.

Another problem with known 3-way switches is the use of colored sleeves attached to the toggle throws. Sleeves on a round toggle may fall off at the most inopportune time.

What is lacking in the industry is a 3-way selector switch having positive contacts and replaceable toggles.

SUMMARY OF THE INVENTION

Disclosed is an improved 3-way selector switch. The switch provides a replaceable toggle lever wherein a selection of toggle levers can be used to provide color and tactile touch identification. The switch further provides a common ground and an electrical contact with reciprocal shapes to provide premium coupling to eliminate signal loss.

An objective of the invention is to provide an improved 3-way selector switch that eliminates signal loss.

Another objective of the invention is to provide a 3-way toggle switch suitable for a two-pickup guitar with humbuckers, single-coils, or a combination of both.

Still another objective of the invention is to provide a no-noise 3-way switch for electric guitars.

Still another objective of the invention is to teach the use of a 16 mm contact.

Yet still another objective of the invention is to teach the use of a 16 mm contact with reciprocal surfaces to increase voltage handling.

Still another objective of the invention is to provide a switch that can use mini toggle, larger scale size toggles, or any size in between.

Yet another objective is to provide an improved switch that may be adapted for use in applications directed to marine, recreational vehicles, aviation and like industries that can benefit from a switch capable of handling higher voltages, currents, or would otherwise benefit from address signal degradation in a 3-way switch.

Other objectives and further advantages and benefits associated with this invention will be apparent to those skilled in the art from the description, examples, and claims which follow.

DETAILED DESCRIPTION OF THE PREFERRED EMBODIMENT

Figure 1:
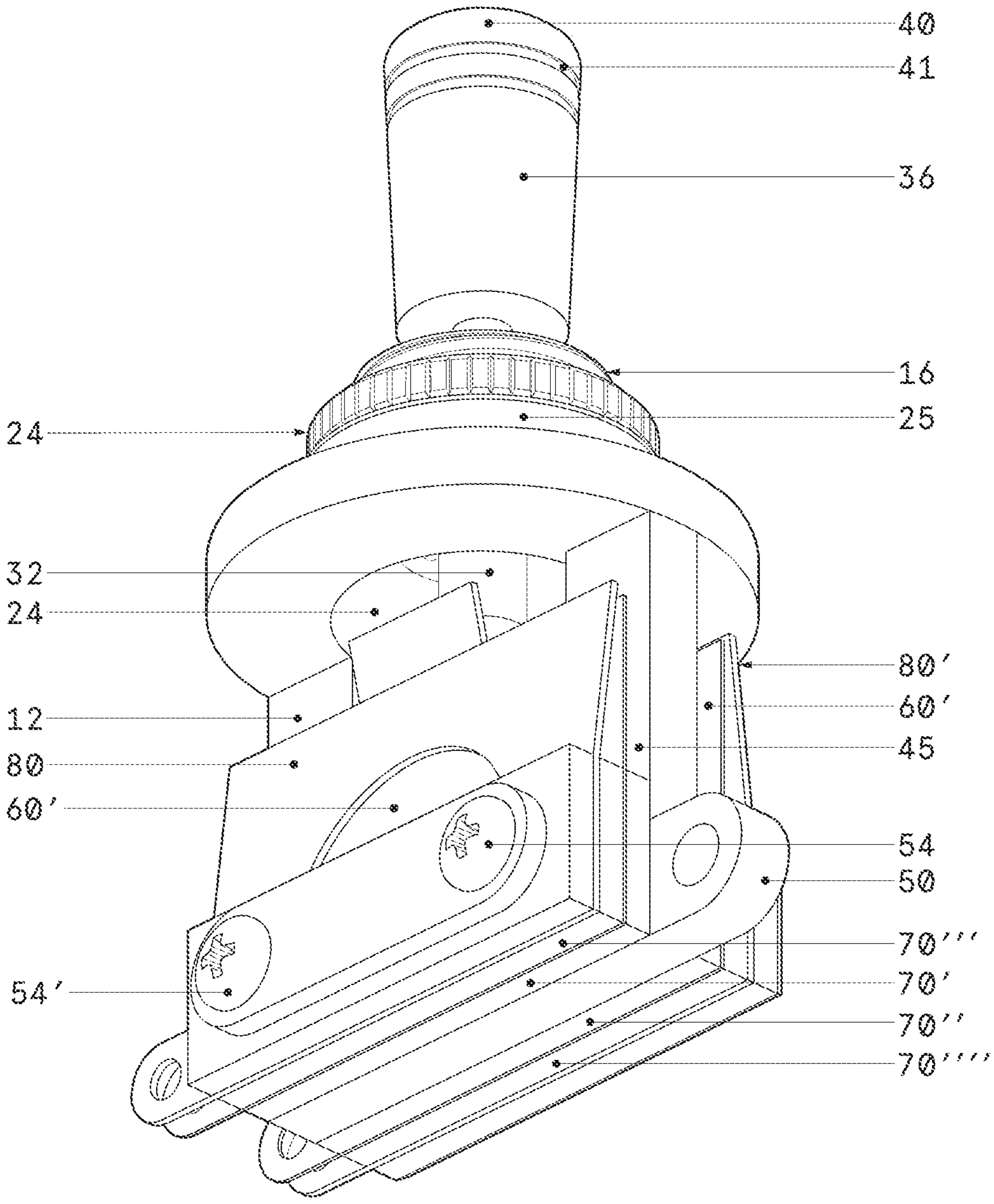
FIG. 1 is a front lower perspective view of the 3-way selector switch.
Figure 2:
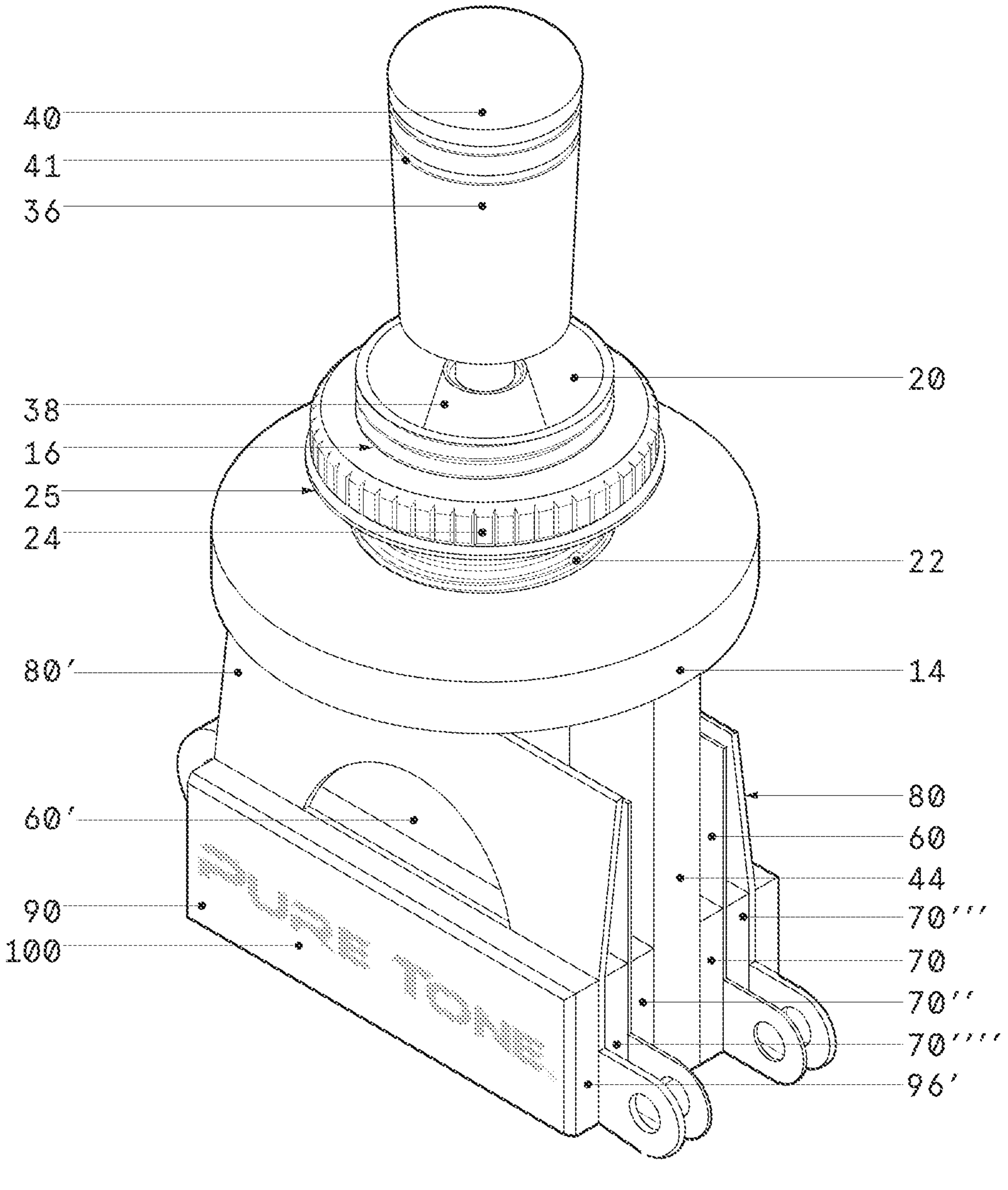
FIG. 2 is a back upper perspective view thereof.
Figure 4:
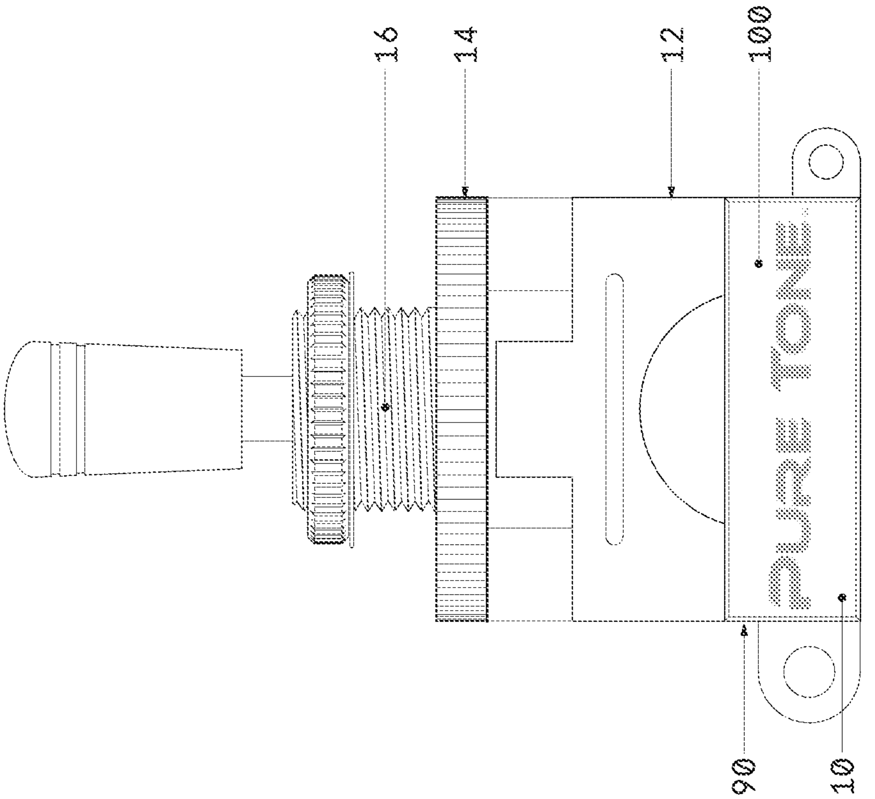
FIG. 4 is a back plane view thereof.
Figure 3:
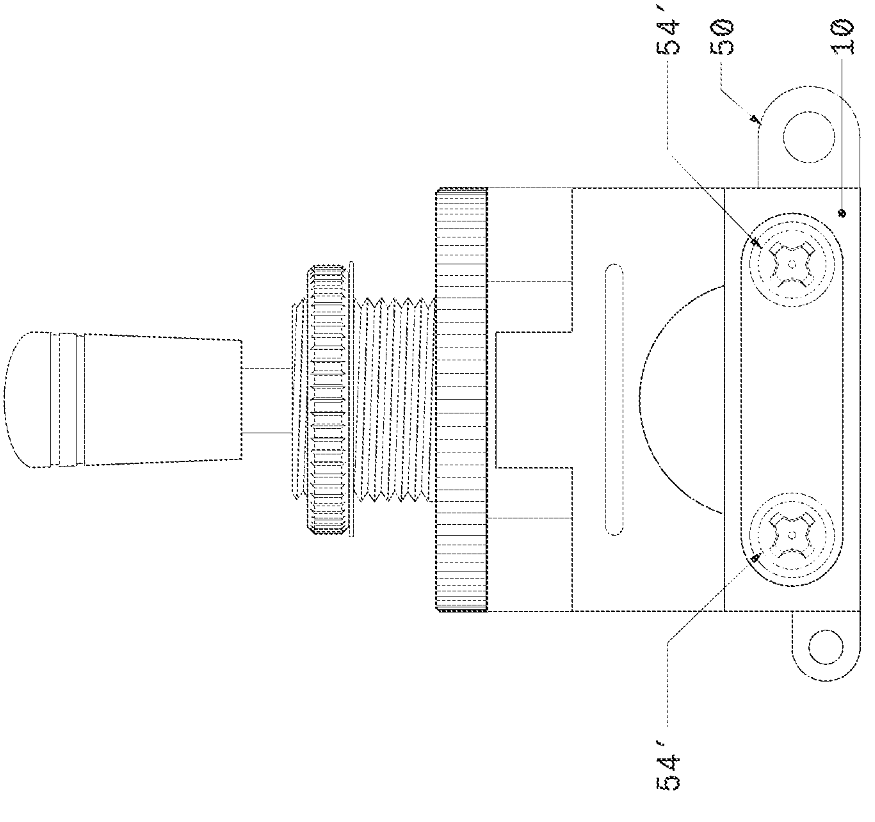
FIG. 3 is a front plane view thereof.
Figure 5:
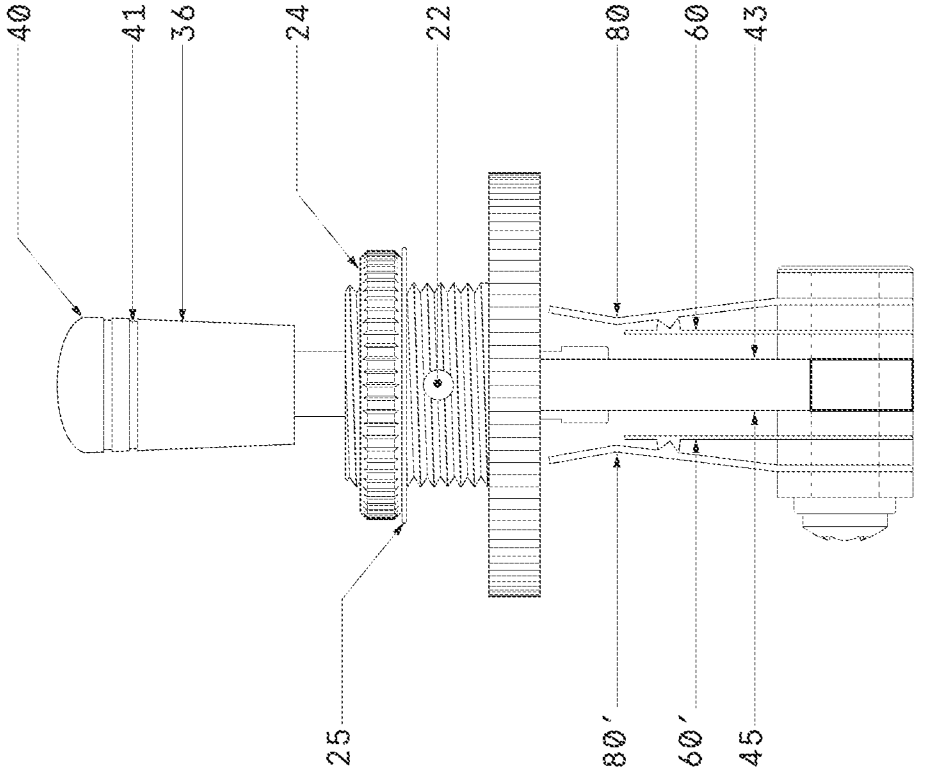
FIG. 5 is a left side view thereof.
Figure 6:
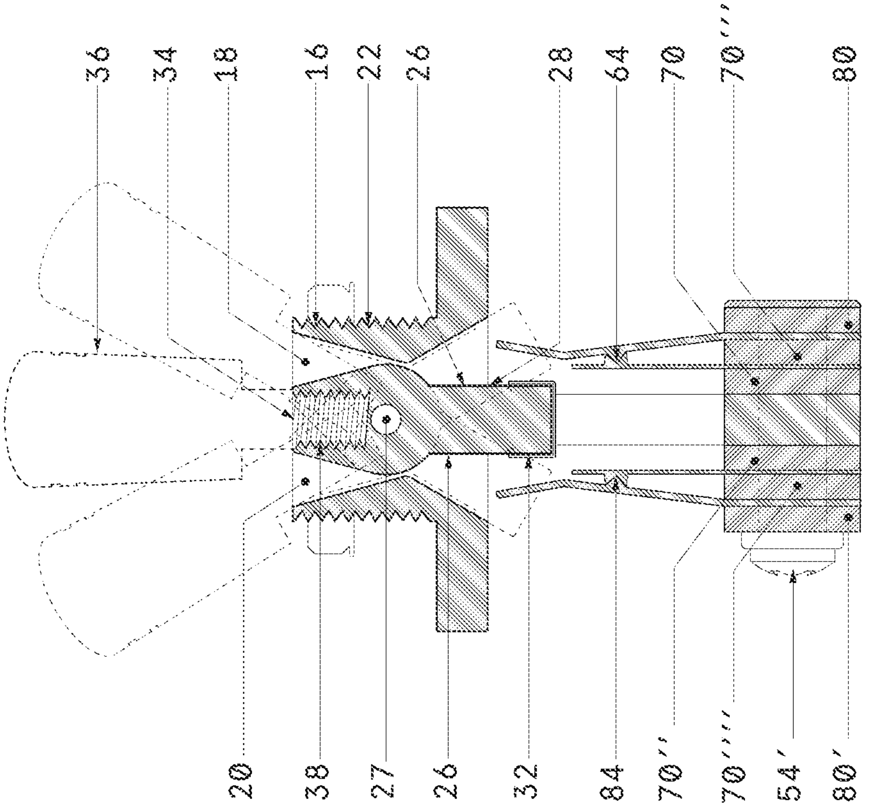
FIG. 6 is a cross sectional side view thereof.
Figure 7:
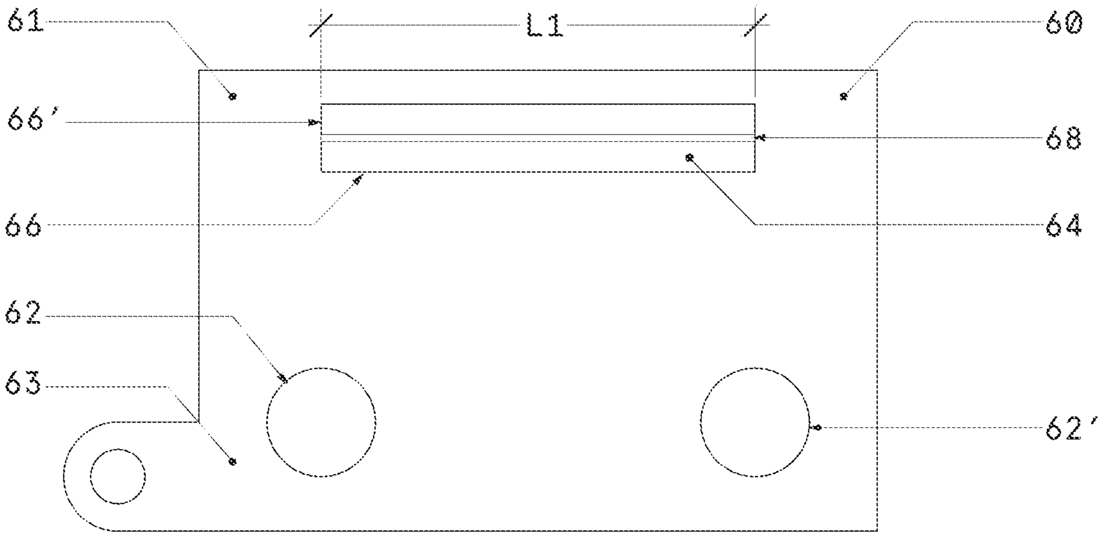
FIG. 7 is a front plane view of an inner pressure plate.
Figure 8:
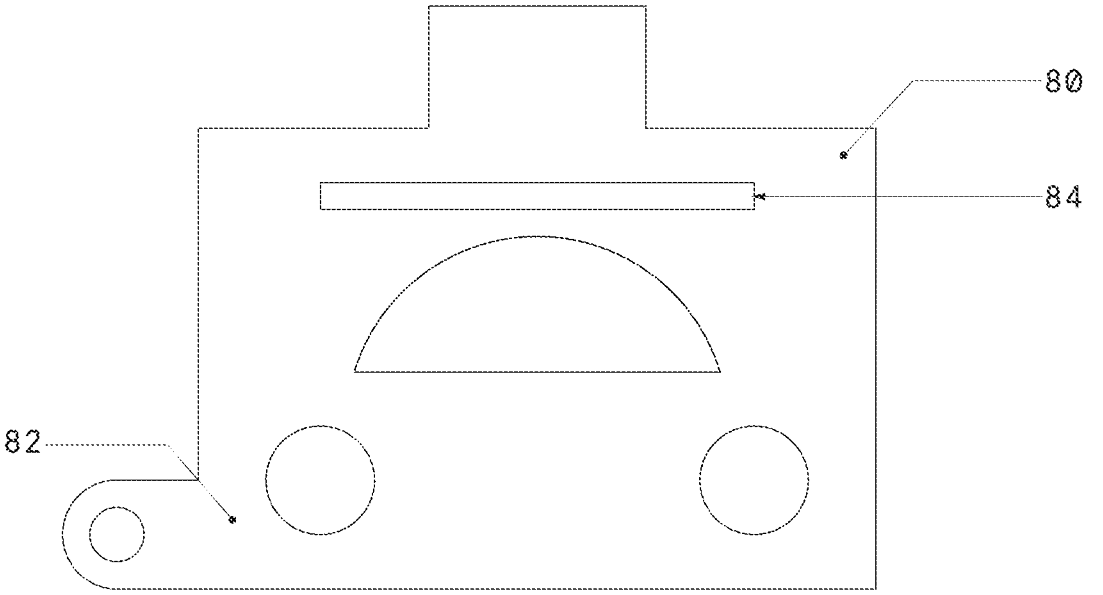
FIG. 8 is a front plane view of an outer pressure plate.
Figure 9:
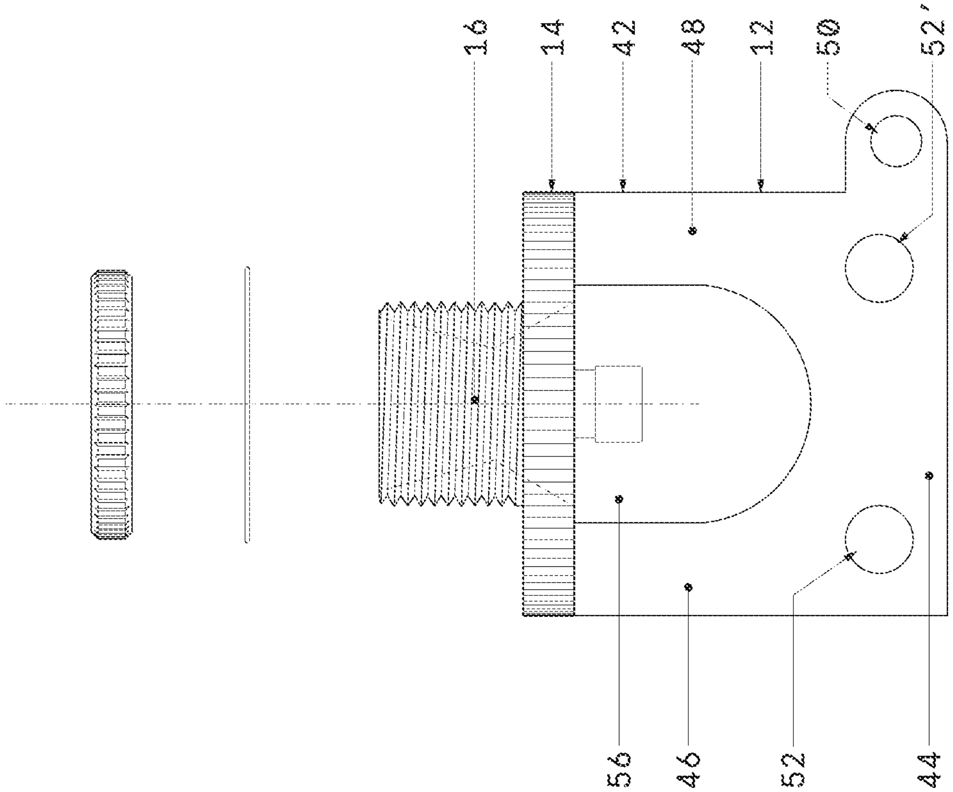
FIG. 9 is a front view of the frame assembly.
Figure 10:
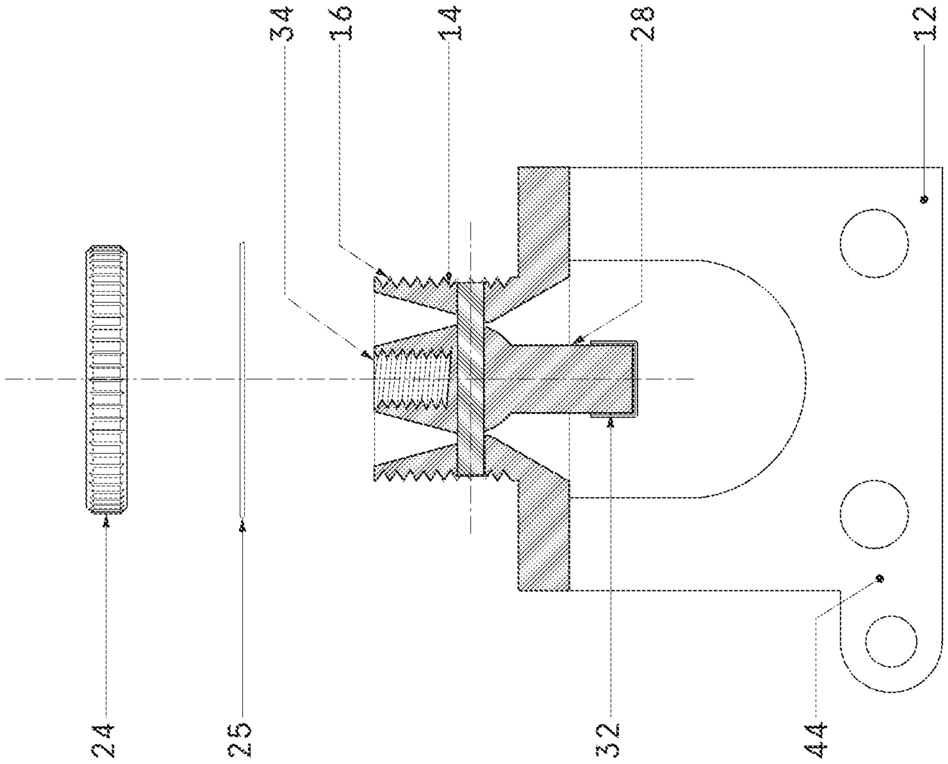
FIG. 10 is a cross sectional view of the frame assembly toggle lever base.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Now referring to the drawings, set forth is a 3-way selector switch 10 comprising a frame assembly 12 with an upper member 14. The upper member 14 is formed from a circular shaped support 16 having a centrally disposed aperture 18 forming an inner surface 20 and a threaded outer surface 22 receptive to a fastening nut 24. In a preferred embodiment, the outer surface of the fastening nut 24 has knurling to allow assembly without tools. A washer 25 allows ease of assembly. The upper member 14 pivotally supports a toggle base 26 that pivots along a pin 27, wherein the aperture 18 is constructed and arranged to allow the toggle base 26 to rotate about 30 degrees on either side of a centrally disposed position; the toggle base 26 having a bottom shank with a distal end insulating cap 32 made of nylon or the like non-conductive material. The toggle base 26 has a threaded proximal receptacle 34 for receipt of a toggle lever 36; the toggle lever 36 having a threaded proximal end 38 removably attached to the threaded receptacle end of said toggle base 26, and a distal end 40 having a shape or channels 41 providing a tactile touch surface. The toggle lever 36 can be easily replaced if damaged or if another color or shape is desired. For instance, the distal end 40 may consist of round toggle levers, flat toggle levers, curved toggle levers, or combinations thereof. The particular shape desired can be selected by the individual, wherein the shape provides a tactile feel that can be easily identified by the individual. For instance, an on/off toggle lever may be constructed from a flat duck shape, while an amp toggle lever may be made square shaped. The replaceable toggle lever lowers inventory costs, wherein the electrical switch is universal and the various toggle levers can be added to the switch. Further, the toggle lever 36 can be formed using a 3D printer, wherein the owner of the device can select from various predetermined shapes, or further customize a shape. The toggle levers 36 can be selected from a material color, or use a coated material or a sleeve made of a material that can be slid onto the toggle lever. A bottom 42 of said frame assembly 12 is formed from a base 44 coupled to said upper member 14 by a first leg 46 spaced apart from a second leg 48; the frame assembly 12 having a grounding terminal 50 extending from the base 44. Apertures 52, 52' are for receipt of fasteners 54, 54' to maintain positioning of connection plates as further described herein. A U-shaped opening 56 allows uninhibited movement of the toggle base 26 across a 60 degree rotation.

A first inner connection plate 60 has a lower end 63 coupled to a first side 43 of the base 44 with apertures 62, 62' for receipt of fasteners 54, 54'. The first inner connection plate 60 is insulated from the base 44 by a first insulating spacer 70, and an upper end 61 of the first inner connection plate 60 having a first inner contact 64 with a length L1 of about 16 mm. The inner contact 64 is formed of a V-shape wherein side walls 66, 66' are raised above a center area 68.

A second inner connection plate 60' has a lower end coupled to a second side 45 of the base 44. The second connection plate 60' is insulated from said base 44 by a second insulating spacer 70", the first connection plate 60 electrically coupled to the second connection plate 60'; an upper end of the second connection plate 60' having an inner contact 64 with a length of about 16 mm. It is noted that the second inner connection plate 60' forms a mirror image of said first inner connection plate 60 wherein the plates are interchangeable, reducing manufacturing requirements and inventory storage.

A first outer connection plate 80 has a lower end 82 coupled to the first side 43 of the base 44. The first outer connection plate 80 is insulated from the first inner connection plate 60 by a third insulating spacer 70'". An upper end of the first outer connection plate 80 has an outer contact 84 with a length of about 16 mm constructed and arranged to engage the first inner contact 64. The shape of the outer contact 84 is constructed and arranged to interface with said first inner contact 64 and, in particular, within the side walls 66, 66' providing positive contact along the length L1 of the contact 64.

Figure 11:
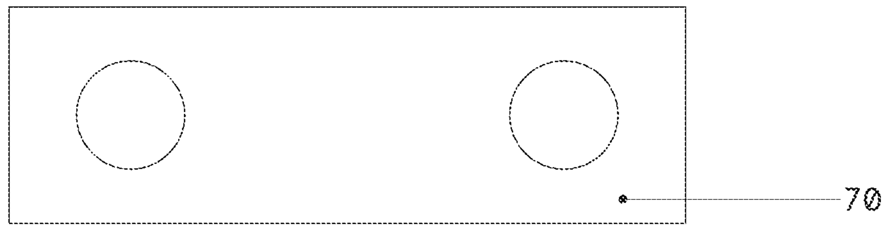
FIG. 11 is a front view of a phenolic spacer.
Figure 12:
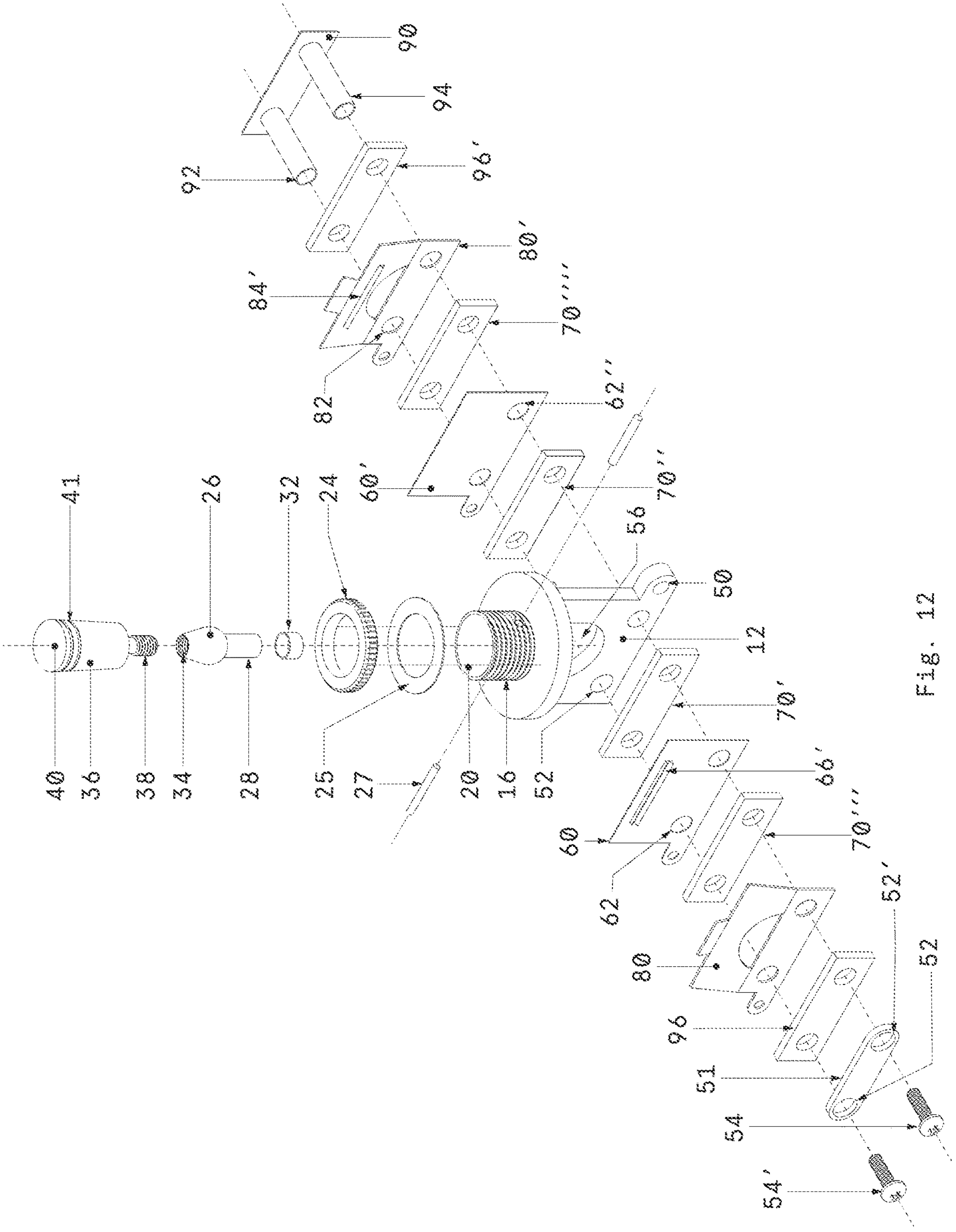
FIG. 12 is an exploded view of the 3-way selector switch.

A second outer connection plate 80' has a lower end coupled to the second side 45 of the base 44. The second outer connection plate 80' is insulated from the second inner connection plate 60' by a fourth insulating spacer 70"". An upper end of the second outer connection plate 80' has an outer contact 84' with a length constructed and arranged to engage the first inner contact 64. The insulating spacers (70, 70", 70'", 70"") are preferably a phenolic spacer of the shape and size illustrated in FIGS. 11 and 12 to allow interchangeability and reduce production costs. Similarly, the outer connection plates (80, 80') are interchangeable, and the inner connection plates (60, 60') are interchangeable.

A fastener 54, preferably a threaded screw, is used to secure the inner 60, 60' plates, outer 80, 80' plates, and phenolic spacers (70, 70", 70'" 70"") to the frame 12. An insulated bushing 90 having a threaded receptacle 92 is used as a nut fastener for receipt of the fastener 54. In the preferred embodiment there are two fasteners 54, each fastener separated from the outer connection plates 80, 80' by an insulated spacer 96, 96' and an outer surface of the insulated bushing 90 coated with an insulating material 94, such as rubber or the like. While all insulated bushings are of the same size and shape, insulated bushings 90, 90' are indicated by a separate element number as they can include a logo 100 along an outer surface.

Figure 13:
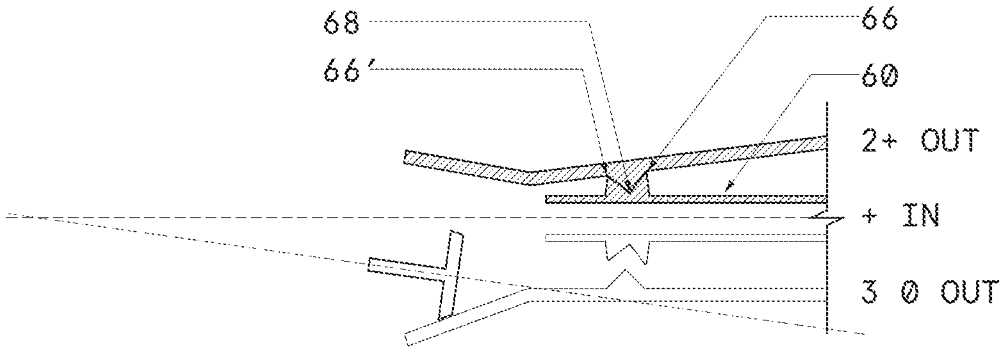
FIG. 13 is an electrical contact diagram with a centered toggle lever.
Figure 14:
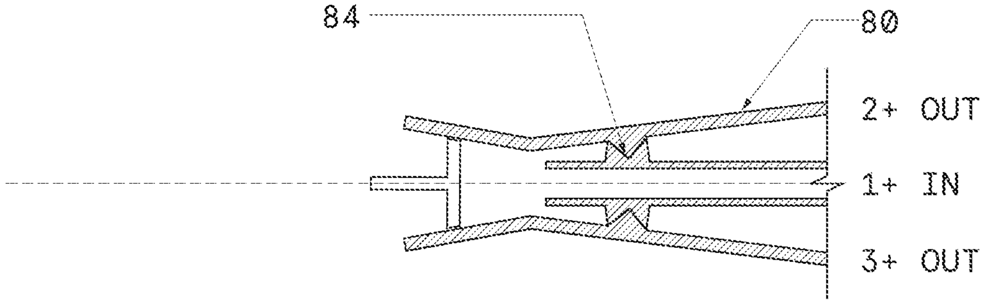
FIG. 14 is an electrical contact diagram with a centered toggle lever.
Figure 15:
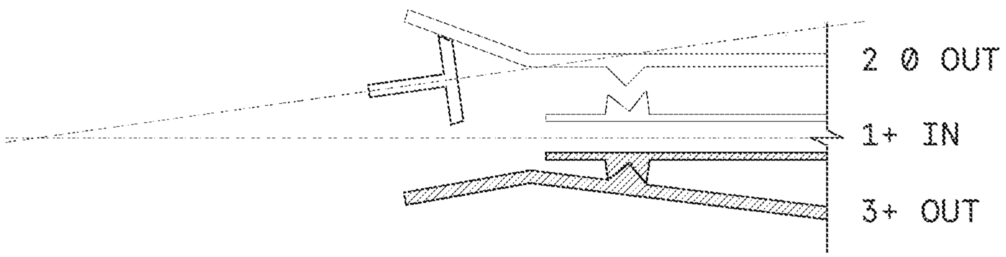
FIG. 15 is an electrical contact diagram with a centered toggle lever.

Referring to FIG. 13, signal power to terminal 1 transfers to terminal 2 and 3. Referring to FIG. 14, rotating the toggle lever 30 degrees in a first direction around the pivot pin allows signal power from terminal 1 to transfer only to terminal 2. Referring to FIG. 15, rotating the toggle lever 30 degrees in a second direction around the pivot pin allows signal power from terminal 1 to transfer only to terminal 3. The frame assembly operates as the ground.

The term "coupled" is defined as connected, although not necessarily directly, and not necessarily mechanically. All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A 3-way selector switch comprising:

a frame assembly defined by an upper member and a lower member, said upper member formed from a circular shaped support having a centrally disposed aperture forming an inner surface, and a threaded outer surface receptive to a fastening nut, said lower member formed from a base coupled to said upper member by first and second spaced apart legs, said frame assembly having a grounding terminal extending from said base;

a first inner connection plate having a lower end coupled to a first side of said base, said first inner connection plate insulated from said base by a first insulating spacer, an upper end of said first inner connection plate having a first inner contact with a length of about 16 mm;

a second inner connection plate having a lower end coupled to a second side of said base, said second inner connection plate insulated from said base by a second insulating spacer, said second inner connection plate electrically coupled to said first connection plate, an upper end of said second connection plate having a second inner contact with a length of about 16 mm;

a first outer connection plate having a lower end coupled to said first side of said base, said first outer connection plate insulated from said first inner connection plate by a third insulating spacer, an upper end of said first outer connection plate having an outer contact with a length constructed and arranged to engage said first inner contact;

a second outer connection plate having a lower end coupled to said second side of said base, said second outer connection plate insulated from said first inner connection plate by a fourth insulating spacer, an upper end of said second outer connection plate having an outer contact with a length constructed and arranged to engage said first inner contact;

at least one fastener securing said first and second inner connection plates and said first and second outer connection plates to said base of said frame assembly, said fastener isolated from said first and second outer connection plate by an insulating spacer, said fastener formed from a threaded screw extending through said connection plates and engaging a threaded nut plate;

a toggle base positioned in said centrally disposed aperture and pivotally attached thereto, said toggle base having a bottom shank with an insulating cap constructed and arranged to be positioned between said first and second outer connection plates in a first position, said toggle base engaging said first outer connection plate in a second position, said toggle base engaging said second outer connection plate in a third position, said toggle base having a threaded receptacle; and a toggle lever having a threaded proximal end removably attached to said threaded receptacle of said toggle base, and a distal end having a shaped end.

2. The 3-way selector switch according to claim 1 wherein each said inner contact has a receptacle configuration constructed and arranged to interface with a protrusion on each said outer contact.

3. The 3-way selector switch according to claim 1 wherein each said outer contact has a receptacle configuration constructed and arranged to interface with a protrusion on each said inner contact.

4. The 3-way selector switch according to claim 1 wherein each said outer contact has a length of about 16 mm to coincide with each said inner contact.

5. The 3-way selector switch according to claim 1 wherein each said insulating spacer is further defined as a material that is not conductive of electricity.

6. The 3-way selector switch according to claim 1 wherein said insulating spacer is constructed of a phenoic material.

7. The 3-way selector switch according to claim 1 wherein said shaped end is selected from a group consisting of a round toggle lever, a flat toggle lever, and a curved toggle lever.

8. The 3-way selector switch according to claim 1 wherein said toggle lever is colored.

9. The 3-way selector switch according to claim 1 wherein said toggle lever includes at least one channel for a tactile surface.

10. The 3-way selector switch according to claim 1 wherein said fastening nut is knurled to allow fastening without tools.

11. The 3-way selector switch according to claim 1 wherein said toggle base is pivoted about 30 degrees to engage said first outer connection plate and about 30 degrees to engage said second outer connection plate.

* * * * *